UNITED STATES PATENT OFFICE.

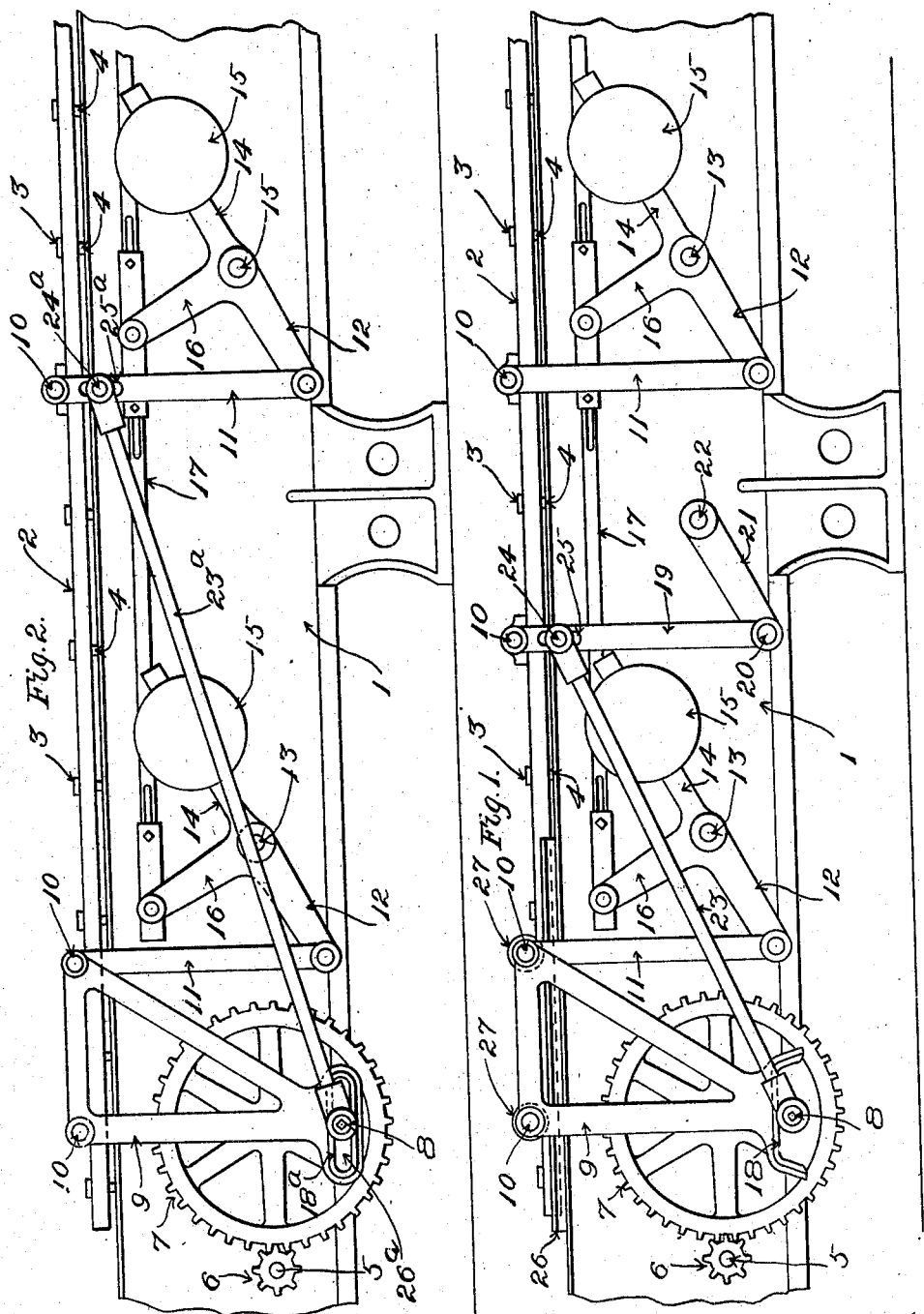

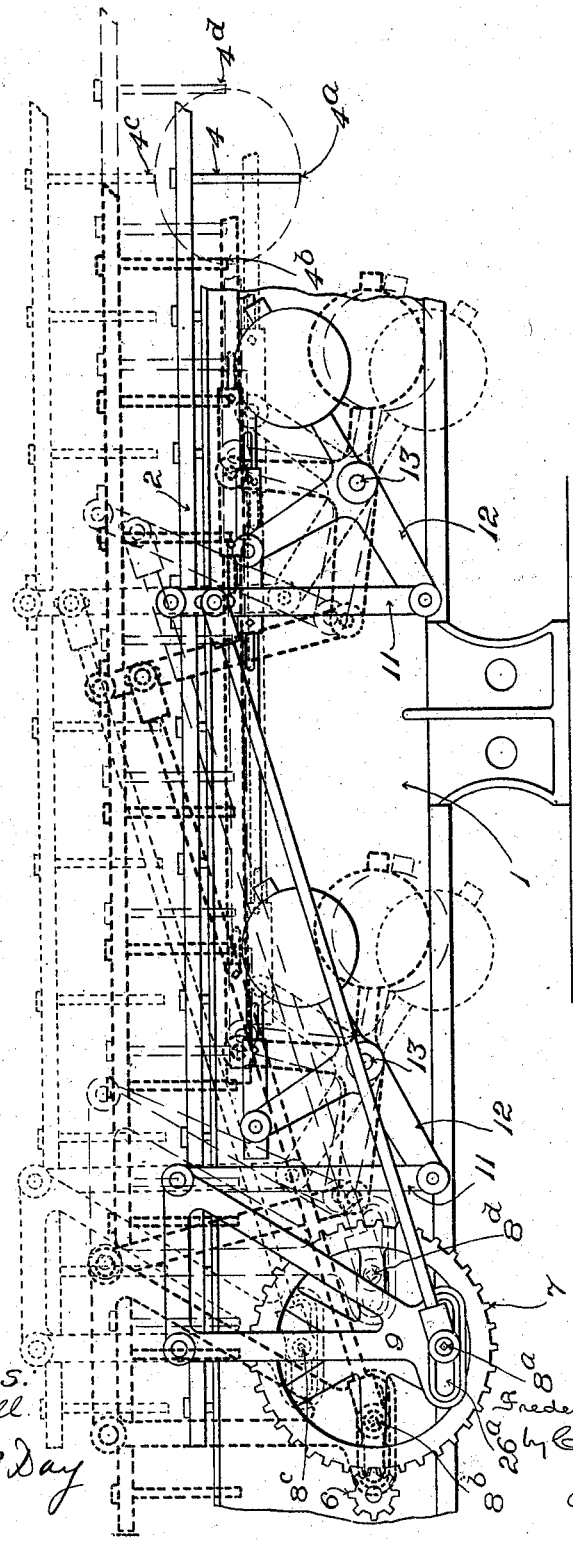

FREDERICK G. SARGENT, OF GRANITEVILLE, MASSACHUSETTS, ASSIGNOR TO C. G. SARGENT'S SONS CORPORATION, OF GRANITEVILLE, MASSACHUSETTS, A CORPORATION OF MASSACHUSETTS.

WOOL-WASHING MACHINE.

981,123.  Specification of Letters Patent.  Patented Jan. 10, 1911.

Application filed March 25, 1907. Serial No. 364,419.

*To all whom it may concern:*

Be it known that I, FREDERICK G. SARGENT, a citizen of the United States, residing at Graniteville, in the county of Middlesex, State of Massachusetts, have invented a certain new and useful Improvement in Wool-Washing Machines, of which the following is a specification, reference being had therein to the accompanying drawings.

The invention relates more particularly to the mechanism of wool-washing machines by which the rake or harrow of a machine of such class is operated to advance the wool that is immersed in the liquor within the bowl or trough, from the feeding end of the bowl or trough to the delivery end thereof. As is well-known, in the working of the machine the said rake or harrow is raised to withdraw its teeth from the contents of the bowl, then while uplifted is moved endwise in the direction of the feeding end of the bowl, then lowered to plunge its teeth into the contents of the bowl, and then while lowered is moved endwise in the direction of the delivery-end of the machine to advance the submerged wool in that direction, again raised, and so on. These movements of the rake or harrow have been communicated to the same usually by cranks, or cranks and cams, on a cross-shaft or shafts located at or near one end of the bowl.

An arrangement that has gone into quite general use comprises a cross-shaft having a crank, the pin of the latter working in a vertical slot in a piece fixedly connected with the rake. In the rotation of the shaft and crank, pressure of the crank-pin against one side-wall of the slot moves the rake endwise in the corresponding direction; then, the crank by engaging the upper end-wall of the slot lifts the rake and concurrently with such action by pressing against the other side-wall of the slot carries the uplifted rake endwise in the opposite direction, the rake being gradually lowered by the rotation of the crank until rolls carried by it take bearing upon fixed tracks on the sides of the bowl, after which the pressure of the crank against the side-wall first referred to causes the lowered rake to move horizontally endwise in the first direction again, and so on. With this arrangement, while the rake is being supported and moved endwise by the crank the path of movement of any given point thereof is circular, and the extent of the endwise movement, as well as that of the lifting movement, are in exact correspondence with the throw of the crank. It may be stated that of late, the cross-shaft usually has been provided at each end with a crank in connection as aforesaid with the corresponding side of the rake.

One purpose of my invention is, in a rake-operating mechanism in which the vertical and endwise components of the movement of the rake are all derived from a rotating actuating crank as aforesaid, to increase the relative extent of the said endwise components and thereby produce a horizontally-extended, preferably elliptical, path of movement of the rake.

Another purpose thereof is to provide a construction of rake-operating mechanism enabling the ratio of the longitudinal movement of the rake with respect to the throw of the crank and its capacity for lifting the rake to be made greater or less in particular cases, as found desirable.

In practice, the action of the crank-pin against the vertical side-walls of the vertical slot in the piece fixed to one end of the rake, especially as the crank-pin acts to begin or arrest the lengthwise movement of the rake in either direction, tends to occasion wear, and also to strain the said piece and the rake, and tends to bend or buckle the rake vertically.

A further purpose of the invention is to transmit the required lengthwise movement from the rotating actuating crank to the rake without straining and racking the parts as heretofore, and without the tendency just referred to to cause the rake to buckle or spring.

Embodiments of the invention are shown in the drawings, in which latter,—

Figure 1 is a side elevation of part of the length of a wool-washing machine with one embodiment of the invention applied thereto. Fig. 2 is a similar view showing a second embodiment. Fig. 3 is a view also showing the said second embodiment, and illustrating by dotted lines different positions assumed by the rake in its movement, and the path of the rake.

Having reference to the drawings,—at 1, in each figure, is shown a part of the length of a bowl or trough, and at 2 a part of one of the side-bars of a rake or harrow, cross-bars or rake-heads being shown at 3, 3, etc., and teeth being partly shown at 4, 4, etc. At 5 is a driving-shaft, extending crosswise of the bowl or trough (in practice through a pipe which has its opposite ends secured in the side-walls of the bowl, as usual). At 6 is a spur-pinion on the shaft 5, meshing with and driving a spur-gear 7. The said spur-gear carries the crank-pin 8 by which the rake is actuated. At 9 is a so-called harp, fixed upon the ends of certain cross-rods 10, 10, forming part of the rake-structure, and engaged by the said crank-pin in manner to produce vertical movements of the rake, as presently will be explained. At 11, 11, are side-arms which, as usual in practice, are connected pivotally by their upper ends with certain of the cross-rods 10, 10, of the rake-structure, and by their lower ends to the arms 12, 12, of rock shafts 13, 13, the said rock shafts extending (as usual through pipes, not shown) to the other side of the bowl. With the said rock shafts are connected also other arms 14, 14, carrying weights 15, 15, by which the rake is counterbalanced, the rock shafts having connected therewith in addition the arms 16, 16, which are joined to one another by tie-rod 17 to link the counterbalances in one system and cause them to operate in unison. As thus far referred to, the parts are or may be as heretofore, and may operate in usual manner, with the exception of the harp and the manner in which the rake is connected with and operated from the crank. Spur-gear 7, in practice, will be fixed upon a cross-shaft (not shown) extending to the other side of the bowl and there carrying a wheel and crank, which last will be operatively combined at such side of the bowl with the rake by connections duplicating those which I will now proceed to explain with reference to the cranks 8 of Figs. 1 and 2.

In carrying my invention into effect I dispense with the vertical slot of the harp, above referred to, and produce the vertical components, alone, of the movement of the rake through the engagement of the crank-pin with the harp. Thus, I form the harp with the bearing-surface 18 extending in the direction of the length of the rake, for engagement with the crank-pin. In the rotation of the crank the upward pressure of the crank-pin against this bearing-surface lifts the rake, and as the crank turns downward the bearing surface rests on the crank-pin so that the rake descends in unison therewith, while movement of the bearing-surface upon the crank-pin in the direction of the length of the rake is permitted. The horizontal components of the movement of the rake are produced by means of other connections between the crank and the rake. The said connections are joined with the rake at an intermediate point in the length of the latter. They preferably are constructed and arranged to communicate to the rake an endwise movement exceeding in length the throw of the crank. A simple means of securing this relatively greater extent of movement is a lever interposed between the crank and the rake. A suitable lever is shown at 19, Fig. 1, it being pivotally connected to the rake at its upper end, as by hanging it upon one of the cross-rods 10, and being pivotally connected at 20 at its lower end to a radius-arm 21 which corresponds in length with one of the arms 12 and is pivoted to the bowl at 22. The said radius-arm permits the lever to rise and lower in unison with the rake. A connecting-rod 23 has one end thereof pivotally connected with crank-pin 8 and the other end thereof connected with a pin 24 carried by lever 19 at an intermediate point between its point of connection with the rake and the pivotal point, 20, of the said lever. The crank-pin operates through the connecting-rod and the lever to produce the endwise, i. e., horizontal components of the movement of the rake.

At 25 is a slot formed lengthwise of lever 19. It will be obvious that by shifting the pin 24 within this slot so as to vary the distance between the pin and the fulcrum 20 of the lever, the leverage will be correspondingly varied, and thereby the extent of the endwise movement transmitted to the rake through the lever. It will be apparent, therefore, that the intermediate lever enables the extent of endwise movement of the rake to be made to suit requirements in practice without requiring any change in the crank.

In the construction shown in Fig. 1 the sides of the bowl are furnished as usual with tracks, one of which is represented at 26, and certain of the cross-rods 10, 10, are furnished with rolls or trucks 27, 27, to travel upon the said tracks, to support the rake in its movement within the bowl in the direction from the feeding end of the bowl toward the delivery end. In this case the rake travels in a straight horizontal line through that portion of its path through which it moves while the rolls are resting on the tracks.

Fig. 2 shows a construction in which the connecting-rod, there marked 23ª, which is connected to crank-pin 8 is connected at its opposite end to a pin 24ª which is carried by one of the side-arms 11, which in this instance is utilized as a motion-transmitting lever to secure the results which are secured by lever 19 of Fig. 1, in addition to performing its usual functions. In this construction the tracks 26 above described are dispensed with, and the crank operates to sustain the rake vertically throughout the entire movement of the rake. The throw of the crank is proportioned to cause the lower ends of the teeth to clear the usual false bottom of the bowl in the lowered position of the rake, and to carry the said ends above the water line to any required extent in the raised position of the rake. In Fig. 2 the bearing surface with which the crank-pin 8 engages is marked 18ª. The harp 9 is formed with a horizontal slot 26ª within which the crank-pin works, although this is not material and the harp may be formed with an opening below the bearing-surface 18ª as in Fig. 1 if deemed advisable.

In Fig. 3, four different positions of the rake are shown in full and dotted lines, respectively, these corresponding with the four positions 8ª, 8ᵇ, 8ᶜ, 8ᵈ, of the actuating crank. The corresponding positions of the tip of one of the rake-teeth are indicated at 4ª, 4ᵇ, 4ᶜ, 4ᵈ, and the path of such point is indicated by the broken-line ellipse at 4ᵉ.

I claim as my invention:—

1. In a wool-washing machine, in combination, the bowl, the rake extending lengthwise thereof and working therein, the crank, and connections through which the said crank communicates vertical and longitudinal movements to the said rake in a horizontally-elongated path and supports the rake through such path.

2. In a wool-washing machine, in combination, the bowl, the rake extending lengthwise thereof and working therein, the crank, and connections through which the said crank communicates vertical and longitudinal movements to the said rake in a horizontally-elliptical path.

3. In a wool-washing machine, in combination, the bowl, the rake extending lengthwise thereof and working therein, the crank, means engaged by the said crank for producing movement of the rake vertically, and a lever operatively connected with the crank and rake and transmitting longitudinal movement to the rake.

4. In a wool-washing machine, in combination, the bowl, the rake extending lengthwise thereof and working therein, the crank, means engaged by said crank for producing movement of the rake vertically, and a lever, mounted to rise and lower, operatively connected with the crank and rake and transmitting longitudinal movement from the crank to the rake.

5. In a wool-washing machine, in combination, the bowl, the rake extending lengthwise thereof and working therein, the crank, means engaged by the said crank for producing movement of the rake vertically, and connections between the said crank and an intermediate point in the length of the rake transmitting to the rake longitudinal movement greater in extent than the throw of the crank.

6. In a wool-washing machine, in combination, the bowl, the rake extending lengthwise thereof and working therein, the crank, a horizontally-elongated bearing surface connected with the rake and with which the crank engages to communicate vertical movements to the rake, and connections from the crank to the rake through which longitudinal movements are communicated from the crank to the rake.

In testimony whereof I affix my signature in presence of two witnesses.

FREDERICK G. SARGENT.

Witnesses:
H. V. HILDRETH,
E. A. NORMINGTON.